United States Patent
Kim et al.

(10) Patent No.: US 11,638,320 B2
(45) Date of Patent: Apr. 25, 2023

(54) METHOD AND APPARATUS FOR RESUMING RRC CONNECTION IN CU-DU DIVISION SCENARIO

(71) Applicant: LG Electronics Inc., Seoul (KR)

(72) Inventors: Seokjung Kim, Seoul (KR); Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 17/156,303

(22) Filed: Jan. 22, 2021

(65) Prior Publication Data

US 2021/0144793 A1    May 13, 2021

Related U.S. Application Data

(63) Continuation of application No. 16/635,463, filed as application No. PCT/KR2018/008620 on Jul. 30, 2018, now Pat. No. 10,904,941.

(Continued)

(30) Foreign Application Priority Data

Jul. 30, 2018  (KR) .................. 10-2018-0088366

(51) Int. Cl.
*H04W 72/12*    (2009.01)
*H04W 76/19*    (2018.01)
(Continued)

(52) U.S. Cl.
CPC ........... *H04W 76/19* (2018.02); *H04W 76/18* (2018.02); *H04W 76/27* (2018.02); *H04W 76/34* (2018.02)

(58) Field of Classification Search
CPC ............ H04W 76/27; H04W 74/0833; H04W 74/004; H04W 28/18; H04W 60/04
See application file for complete search history.

(56) References Cited

U.S. PATENT DOCUMENTS

| | | | |
|---|---|---|---|
| 2015/0237672 A1 | 8/2015 | Kanamarlapudi et al. | |
| 2017/0202050 A1* | 7/2017 | Deng | H04W 72/04 |
| 2018/0302914 A1* | 10/2018 | da Silva | H04W 76/27 |

FOREIGN PATENT DOCUMENTS

| | | |
|---|---|---|
| CN | 106162730 | 11/2016 |
| CN | 108353342 | 7/2018 |

(Continued)

OTHER PUBLICATIONS

CATT, "TP on UE context management for 38.473," R3-172217, 3GPP TSG-RAN WG3 NR AdHoc, Qingdao, China, dated Jun. 27-29, 2017, 9 pages.

(Continued)

*Primary Examiner* — Jamal Javaid
(74) *Attorney, Agent, or Firm* — Fish & Richardson P.C.

(57) ABSTRACT

Provided are a method for resuming, by a distribution unit (DU) of a base station, a radio resource control (RRC) connection in a wireless communication system, and an apparatus for supporting the same. The method may comprise the steps of: receiving, from a terminal, an RRC connection resume request message; transmitting, to a central unit (CU) of the base station, an initial uplink (UL) RRC message transfer message including the RRC connection resume request message; receiving, from the CU, a UE context setup request message including a list of radio bearers to be set up; and transmitting, to the CU, the UE context setup response message including a list of established radio bearers.

15 Claims, 16 Drawing Sheets

Related U.S. Application Data

(60) Provisional application No. 62/538,773, filed on Jul. 30, 2017, provisional application No. 62/566,344, filed on Sep. 30, 2017.

(51) Int. Cl.
   *H04W 76/34* (2018.01)
   *H04W 76/18* (2018.01)
   *H04W 76/27* (2018.01)

(56) References Cited

FOREIGN PATENT DOCUMENTS

| | | |
|---|---|---|
| GB | 2508646 | 6/2014 |
| KR | 1020160135090 | 11/2016 |
| WO | WO2017/116115 | 7/2017 |

OTHER PUBLICATIONS

EP Extended European Search Report in European Appln. No. 18842113.5, dated Feb. 17, 2021, 15 pages.

Huawei, "TP of RRC message transfer on F1," R3-171847, NB3GPP TSG RAN WG3 Meeting #96, Hangzhou, China, dated May 15-19, 2017, 2 pages.

Ericsson, "On the functional distribution over the F1 interface", R3-172023, 3GPP TSG-RAN WG3 #96, Hangzhou, China, May 15-19, 2017, 4 pages.

Huawei, "UE context management on F1", R3-171852, 3GPP TSG-RAN3 Meeting #96, Hangzhou, China, May 15-19, 2017, 4 pages.

Huawei, "F1AP procedures for RRC Connection Setup", R3-171846, 3GPP TSG-RAN3 Meeting #96, Hangzhou, China, May 15-19, 2017, 3 pages.

Huawei, "UE Context Management on F1", R3-172196, NB3GPP TSG RAN WG3 Meeting AdHoc, Qingdao, China, Jun. 27-99, 2017, 7 pages.

KR Office Action in Korean Application No. 10-2018-0088366, dated Oct. 2, 2018, 9 pages (with English translation).

LG Electronics Inc., "Issue on C-RNTI allocation for RRC connection resume", R3-172266, 3GPP TSG-RAN WG3 Meeting #NR AdHoc, Qingdao, P. R. China, Jun. 27-29, 2017, 3 pages.

Office Action in Chinese Appln. No. 201880049859.8, dated Nov. 28, 2022, 22 pages (with English translation).

* cited by examiner

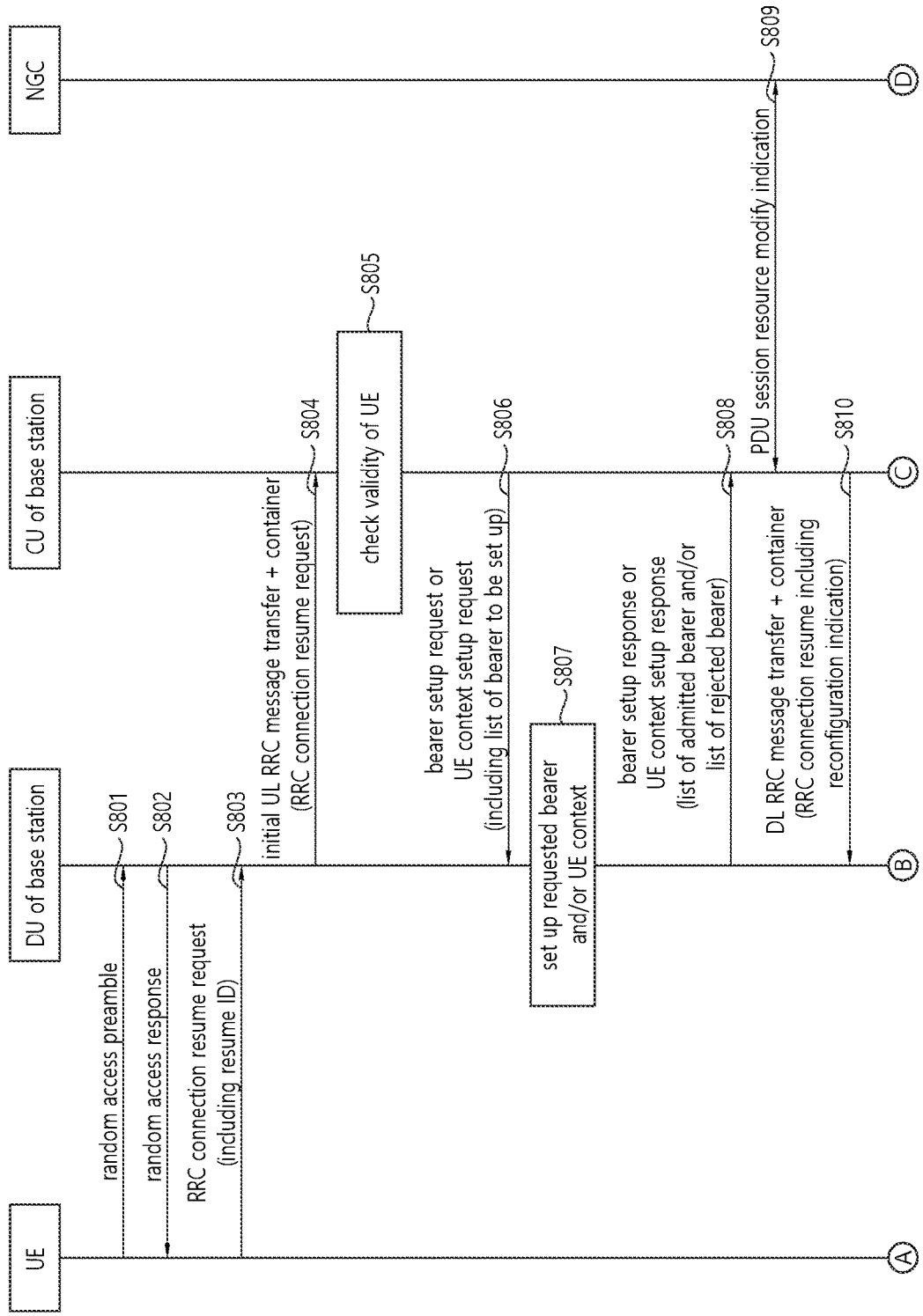

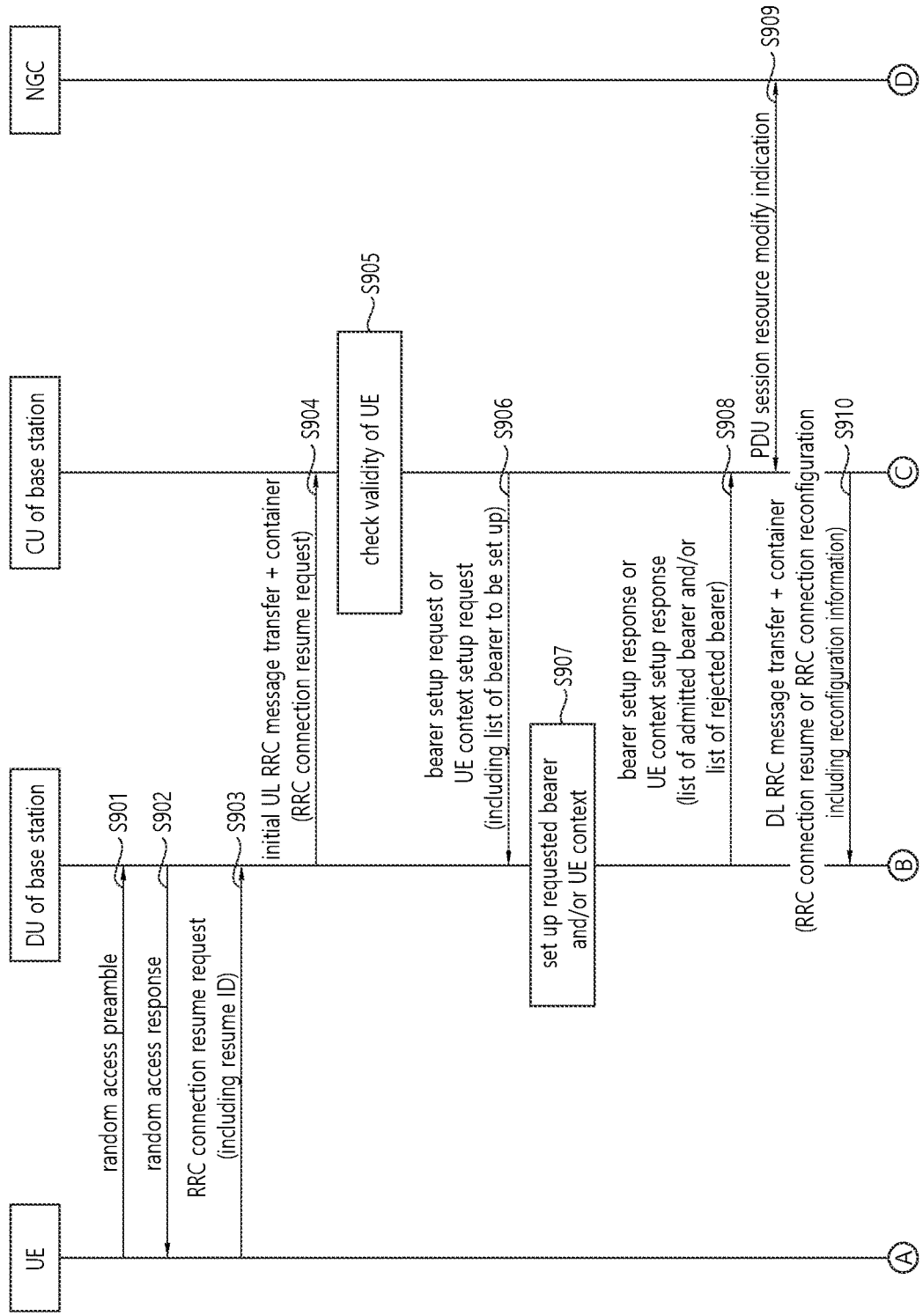

METHOD AND APPARATUS FOR RESUMING RRC CONNECTION IN CU-DU DIVISION SCENARIO

CROSS-REFERENCE TO RELATED APPLICATIONS

This application is a continuation of U.S. application Ser. No. 16/635,463, filed on Jan. 30, 2020, which is a National Stage application under 35 U.S.C. § 371 of International Application No. PCT/KR2018/008620, filed on Jul. 30, 2018, which claims the benefit of U.S. Provisional Applications No. 62/538,773, filed on Jul. 30, 2017, No. 62/566,344, filed on Sep. 30, 2017, and Korean Patent Application No. 10-2018-0088366, filed on Jul. 30, 2018. The disclosures of the prior applications are incorporated by reference in their entirety.

BACKGROUND OF THE DISCLOSURE

Field of the Disclosure

The present disclosure relates to a wireless communication system and, more particularly, to a method for a distributed unit (DU) of a base station to resume an RRC connection and an apparatus supporting the same in a scenario where a central unit (CU) and the DU of the base station are split.

Related Art

In order to meet the demand for wireless data traffic, which has been increasing since the commercialization of a 4th-generation (4G) communication system, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE DISCLOSURE

A DU of a base station can set up only part of a requested RB and/or UE context. In this case, a UE needs to know which RB is resumed or rejected by the base station. When there is no information about which RB is rejected by the DU of the base station, the UE may consider that all suspended RBs are resumed by the base station, which may cause a mismatch in RB between the DU of the base station and the UE. However, the DU of the base station does not host an RRC protocol and thus cannot directly indicate to the UE which RB is rejected. Thus, a CU of the base station needs to report information about an RB successfully resumed and/or an RU not resumed among the suspended RBs to the UE on the basis of a bearer and/or UE context set up by the DU of the base station.

According to one embodiment, there is provided a method for a distributed unit (DU) of a base station to resume an RRC connection in a wireless communication system. The method may include: receiving an RRC connection resume request message from a user equipment (UE); transmitting an initial uplink RRC message transfer message including the RRC connection resume request message to a central unit (CU) of the base station; receiving a UE context setup request message including a list of a radio bearer to be set up from the CU; and transmitting a UE context setup response message including a list of an established radio bearer to the CU.

According to another embodiment, there is provided a distributed unit (DU) of a base station for resuming an RRC access in a wireless communication system. The DU may include: a memory; a transceiver; and a processor to connect the memory and the transceiver, wherein the processor may be configured to control the transceiver to: receive an RRC connection resume request message from a user equipment (UE); transmit an initial uplink RRC message transfer message including the RRC connection resume request message to a central unit (CU) of the base station; receive a UE context setup request message including a list of a radio bearer to be set up from the CU; and transmit a UE context setup response message including a list of an established radio bearer to the CU.

A UE can efficiently set up a suspended RB and/or UE context.

BRIEF DESCRIPTION OF THE DRAWINGS

FIG. 8A and FIG. 8B illustrate a procedure for resuming an RRC connection according to one embodiment of the present disclosure.

FIG. 9A and FIG. 9B illustrate a procedure for resuming an RRC connection according to one embodiment of the present disclosure.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

A 5G system is a technology evolving from the fourth-generation LTE mobile communication technology and supports extended LTE (eLTE), non-3GPP (e.g., wireless local area network (WLAN)) access, or the like as a new radio access technology (RAT) or an extended technology of LTE through evolution of an existing mobile communication network structure or a clean-state structure.

For clarity, the following description will focus on LTE-A and 5G. However, technical features of the present disclosure are not limited thereto.

Figure 1:
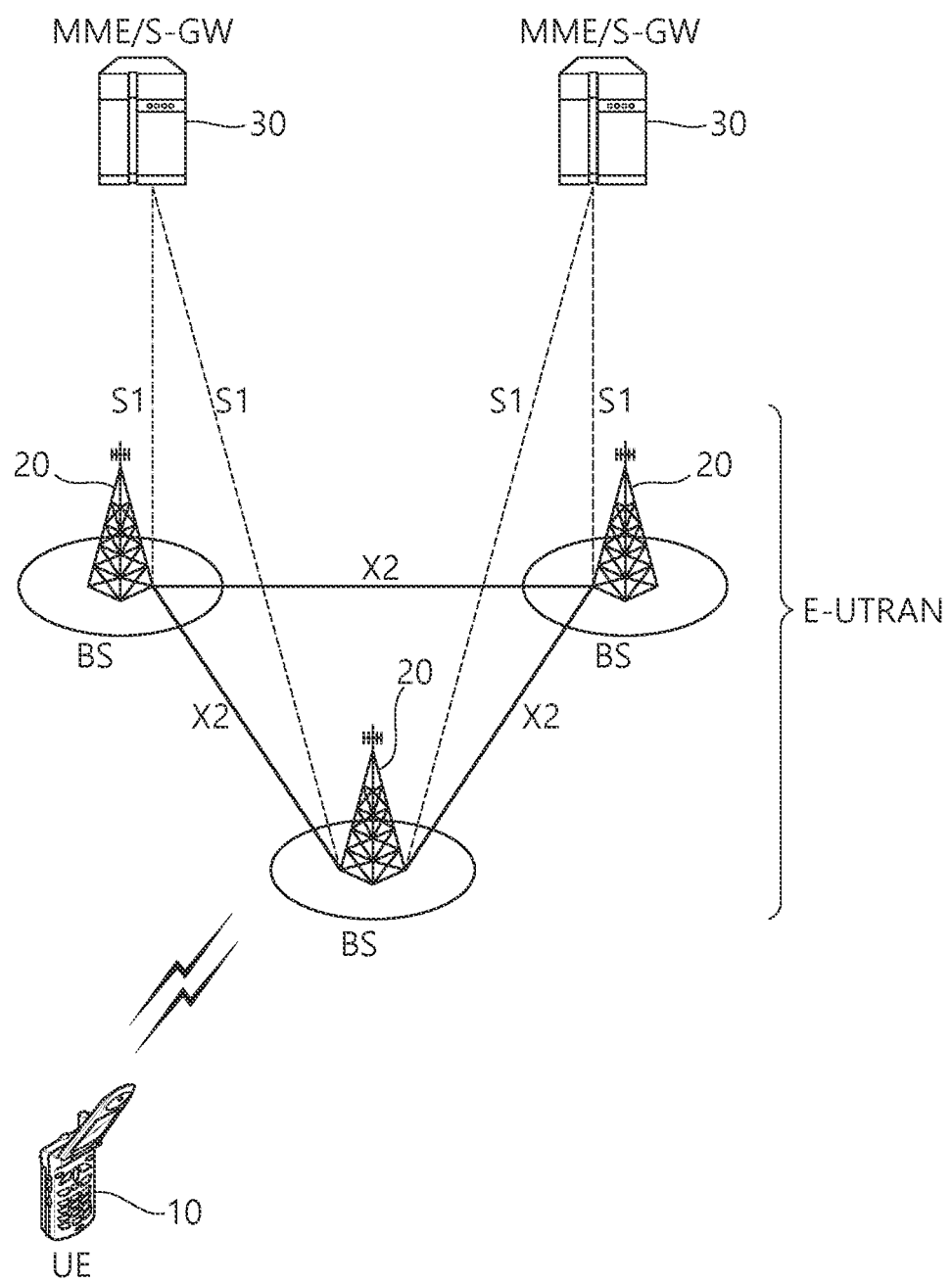
FIG. 1 shows LTE system architecture to which the present disclosure may be applied.

FIG. 1 shows LTE system architecture to which the present disclosure may be applied. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
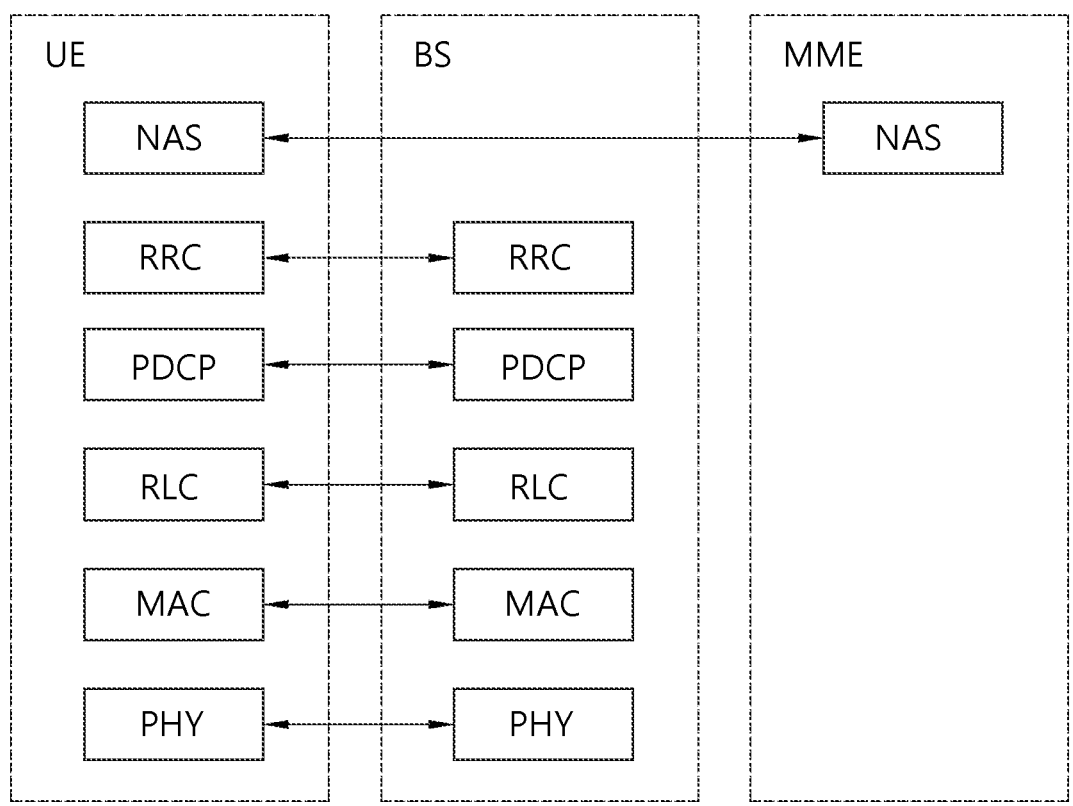
FIG. 2 shows a control plane of a radio interface protocol of an LTE system to which the present disclosure may be applied.
Figure 3:
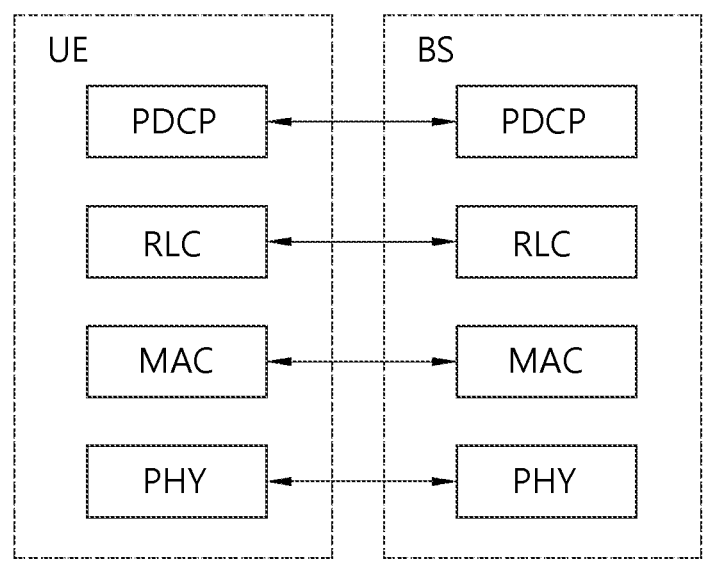
FIG. 3 shows a user plane of a radio interface protocol of an LTE system to which the present disclosure may be applied.

FIG. 2 shows a control plane of a radio interface protocol of an LTE system to which the present disclosure may be applied. FIG. 3 shows a user plane of a radio interface protocol of an LTE system to which the present disclosure may be applied.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G Network Structure is Described.

Figure 4:
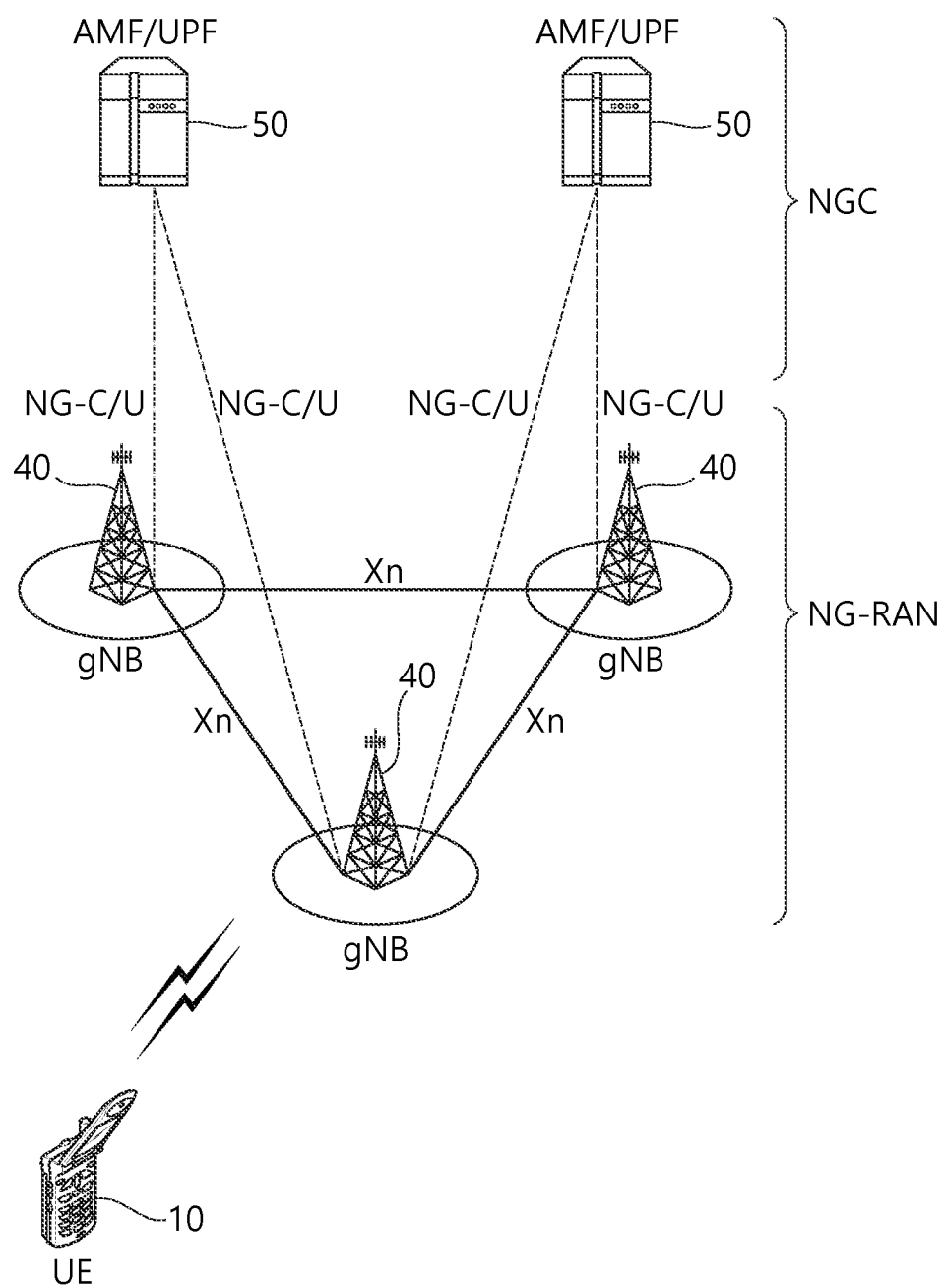
FIG. 4 shows a structure of a 5G system to which the present disclosure may be applied.

FIG. 4 shows a structure of a 5G system to which the present disclosure may be applied.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signaling termination, NAS signaling security, AS security control, inter CN node signaling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Figure 5:
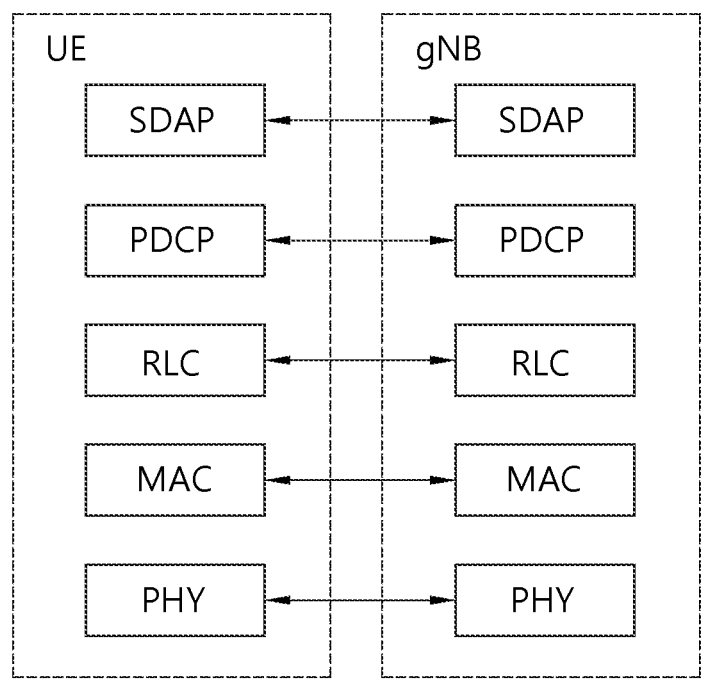
FIG. 5 shows a wireless interface protocol of a 5G system for a user plane to which the present disclosure may be applied.

FIG. 5 shows a wireless interface protocol of a 5G system for a user plane to which the present disclosure may be applied.

Referring to FIG. 5, the wireless interface protocol of the 5G system for the user plane may include a new layer called a service data adaptation protocol (SDAP) in comparison with an LTE system. A primary service and function of the SDAP layer includes mapping between quality of service (QoS) flow and a data radio bearer (DRB) and QoS flow ID (QFI) marking in both DL and UL packets. A single protocol entity of the SDAP may be configured for each individual PDU session, except for dual connectivity (DC) for which two entities can be configured.

Hereinafter, an RRC INACTIVE State of a UE is Described.

In the discussion on NR standardization, an RRC_INACTIVE state has been newly introduced in addition to the existing RRC_CONNETED state and RRC_IDLE state. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG interface between a gNB and a NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

In case of a UE operating in a lightly connected mode, in order to conceal (or hide) the state transition and mobility from the core network, the MME may maintain the SI connection of an activated UE. In other words, in case of a UE operating in the RRC_INACTIVE state, in order to conceal the state transition and mobility from the Next Generation Core (NGC), the AMF may maintain an NG connection of the activated UE. In this specification, the RRC_INACTIVE state may be used as a similar concept of a lightly connected mode, a lightweight connected mode, or a semi-connected mode.

Hereinafter, an RAN-Based Notification Area is Described.

A UE in the RRC_INACTIVE state may be configured with a RAN-based notification area (RNA) by the last serving NG-RAN node. The RAN may cover one or more cells and may be included in a CN registration area. A RAN-based notification area update (RNAU) is periodically transmitted by the UE. In a cell reselection procedure, when the UE selects a cell not belonging to the configured RNA, the RNAU may be transmitted. The RNA may be configured by the following method.

List of cells: The UE may be provided with an explicit list of a cell (one or more cells) forming the RNA.
List of RNAs: The UE may be provided with the ID of at least one RAN, where the RAN may be a subset of CN tracking area or may be the same as a CN tracking area. The RAN may be specified by one RAN area ID including a tracking area identity (TAI) and optionally a RAN area code. The cell may broadcast the RAN area ID through system information.

Hereinafter, a 5G RAN Deployment Scenario Will be Described.

A 5G RAN may be classified into 'non-centralized deployment' scenario, a 'co-sited deployment with E-UTRA' scenario, and a 'centralized deployment' scenario according to a shape of deploying a function of a BS in a central unit and a distributed unit and according to whether it coexists with a 4G BS. In this specification, the 5G RAN, a gNB, a next generation node B, a new RAN, and a new radio BS (NR BS) may imply a newly defined BS for 5G.

Figure 6:
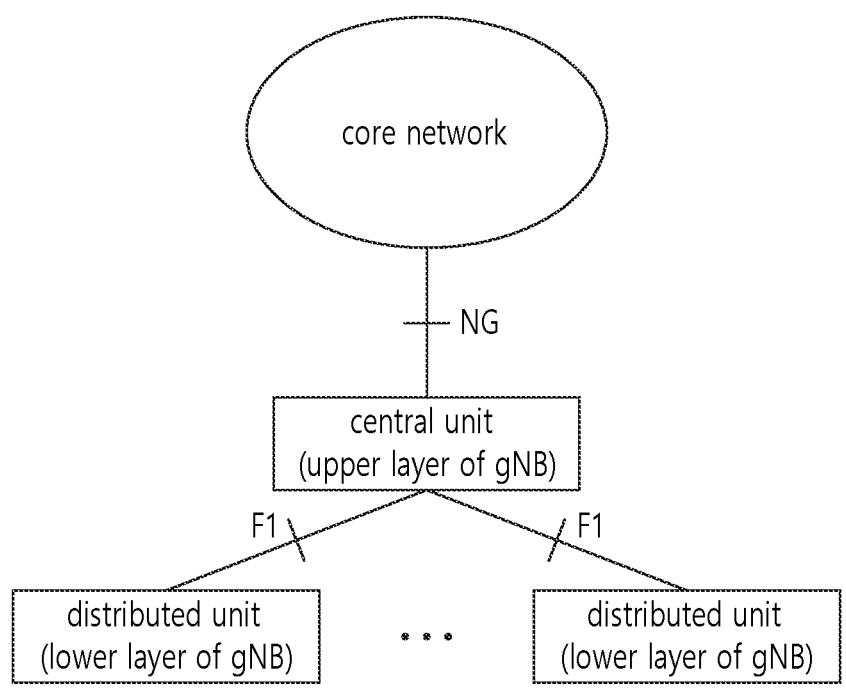
FIG. 6 shows a split-type gNB deployment (centralized deployment) scenario to which the present disclosure may be applied.

FIG. 6 shows a split-type gNB deployment (centralized deployment) scenario to which the present disclosure may be applied.

Referring to FIG. 6, a gNB may be split into a central unit and a distributed unit. That is, the gNB may be operated by being split in a layered manner. The central unit may perform a function of upper layers of the gNB, and the distributed unit may perform a function of lower layers of the gNB.

Hereinafter, the central unit may be referred to as a CU, and the distributed unit may be referred to as a DU in the present specification. The CU may be a logical node which hosts a radio resource control (RRC), service data adaptation protocol (SDAP), and packet data convergence protocol (PDCP) layers of the gNB. The DU may be a logical node which hosts radio link control (RLC), media access control (MAC), and physical (PHY) layers of the gNB. Alternatively, the CU may be a logical node which hosts RRC and PDCP layers of an en-gNB.

In the present specification, a base station supporting a CU and a DU may be referred to as a gNB. In the present specification, an interface between the CU and the DU may be represented by F1, and an interface between the DU and a UE may be represented by Uu. The CU of the base station and the DU of the base station may also be referred to as a gNB-CU and a gNB-DU, respectively.

For a CU-DU split scenario of 5G NR, a method in which a CU and DU of a base station support a UE in the RRC_INACTIVE state is under discussion.

For example, when the UE transitions from the RRC_INACTIVE state to the RRC_CONNECTED state, a problem may occur. When the UE has data to transmit to an NGC or responds to a base station for paging, the UE may request the CU of the base station to resume a suspended radio bearer (RB) in order to transmit data or perform signaling. However, in a CU-DU split case, the CU of the base station still stores UE context of the UE in the RRC_INACTIVE state, but the DU of the base station may not retain any UE context of the UE. Therefore, the CU of the base station needs to set up the RB and/or UE context in the DU of the base station. The DU of the base station may set up only some of requested RBs and/or the UE context for some reason (e.g., a lack of radio resources). In this case, the UE needs to know which RB is resumed or rejected by the base station. When there is no information about which RB is rejected by the DU of the base station, the UE may consider that all suspended RBs are resumed by the base station, which may cause a mismatch in RB between the DU of the base station and the UE. However, the DU of the base station does not host an RRC protocol and thus cannot directly indicate to the UE which RB is rejected. Thus, a CU of the base station needs to report information about an RB successfully resumed and/or an RU not resumed among the suspended RBs to the UE on the basis of a bearer and/or UE context set up by the DU of the base station.

In another example, when the UE notifies a network of being still reachable in a RNA using a periodic RNAU, a problem may occur. The UE may request a transition from the RRC_INACTIVE state to the RRC_CONNECTED state to perform a RNAU. Whenever the UE requests a transition to the RRC_CONNECTED state, the CU of the base station needs to set up an F1 connection for the UE and needs to establish the UE context in the DU of the base station. This is because when the UE enters the RRC_INACTIVE state, the DU of the base station releases the UE context. However, after the periodic RNAU, the UE may return to the RRC_INACTIVE state. That is, the DU of the base station repeatedly establishes and releases the UE context whenever a RNAU is triggered. In particular, there may be no data transmission between the UE and the base station during a RNAU. Therefore, it may be unnecessary and wasteful for the DU of the base station to repeatedly establish and release the UE context whenever a RNAU is triggered.

Figure 7:
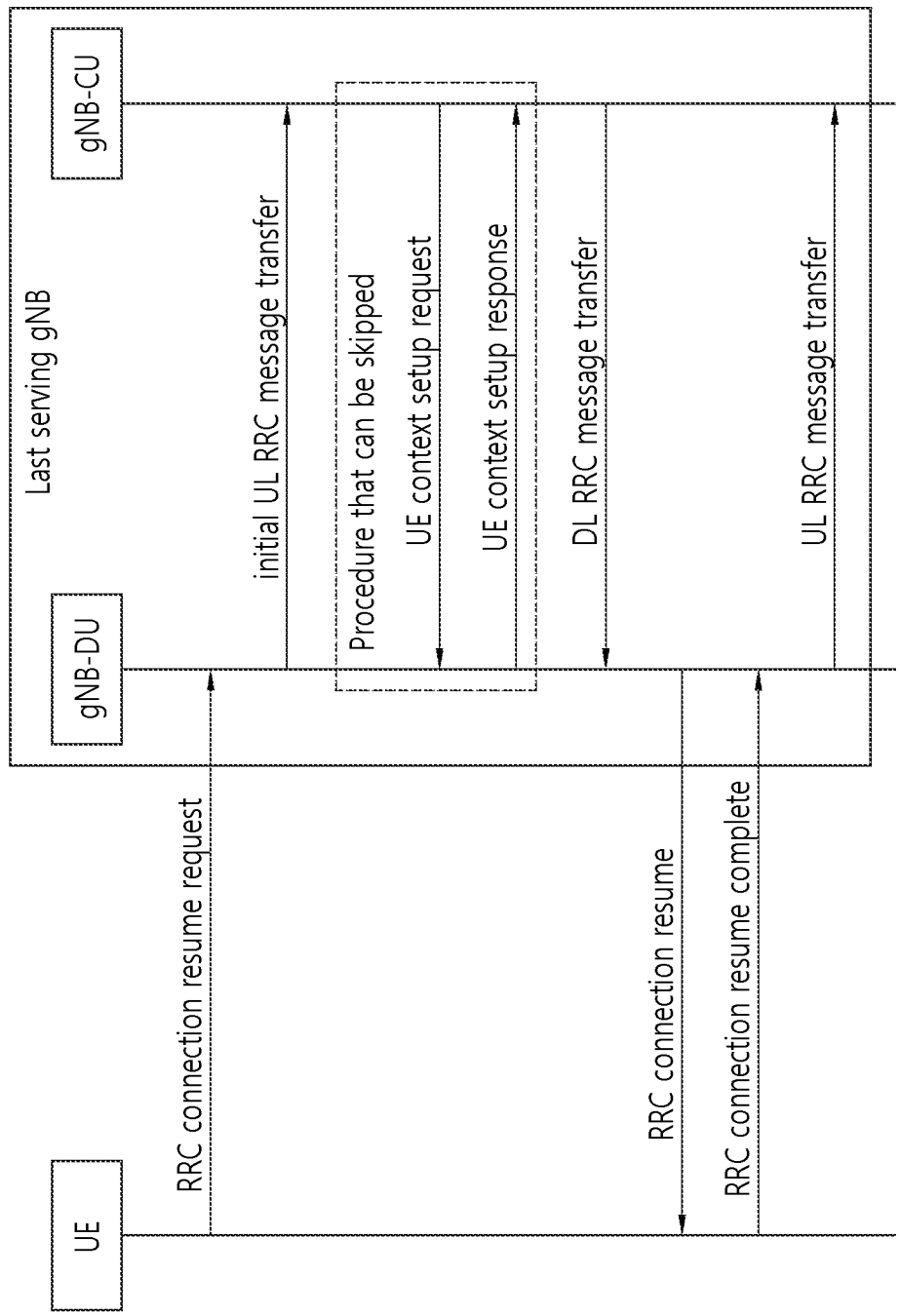
FIG. 7 illustrates a problem that may occur when a UE notifies a network of still being reachable within an RNA using a periodic RNAU.

FIG. 7 illustrates a problem that may occur when a UE notifies a network of still being reachable within a RNA using a periodic RNAU.

Referring to FIG. 7, for the UE to notify the network of still being reachable within the RNA, UE context needs to be established and released in a DU of a base station whenever the UE accesses the base station. However, since there may be no data transmission between the UE and the base station during a RNAU, establishing and releasing the UE context in the DU of the base station may cause unnecessary signaling and additional latency. Therefore, it is necessary to skip establishing and releasing the UE context in the DU of the base station in a particular case.

Hereinafter, a method for resuming an RRC connection and an apparatus supporting the same in a CU-DU split scenario will be described according to one embodiment of the present disclosure.

Figure 8B:
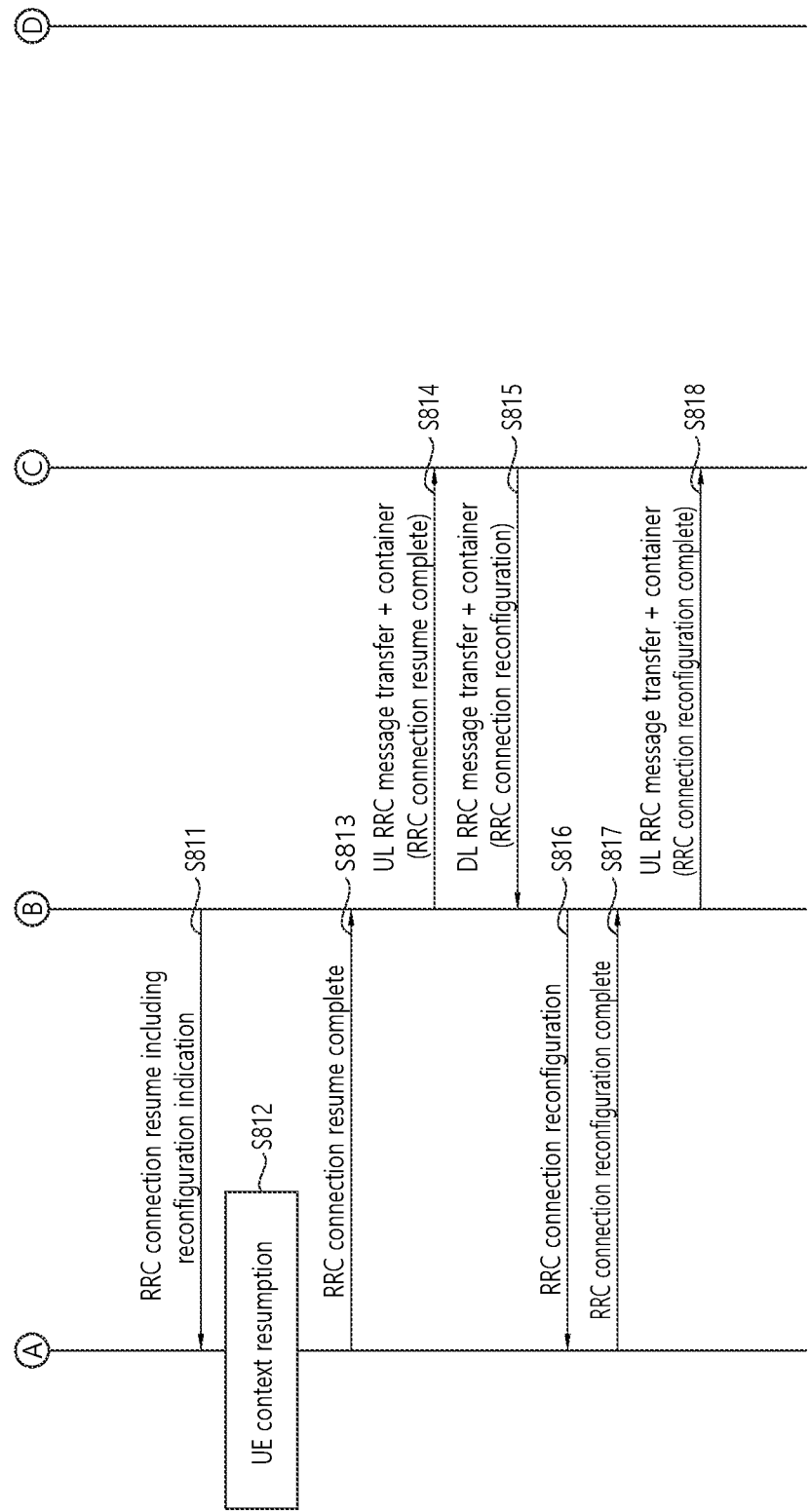

FIG. 8A and FIG. 8B illustrate a procedure for resuming an RRC connection according to one embodiment of the present disclosure.

Referring to FIG. 8A, a UE may be in the RRC_INACTIVE state. Therefore, an NG connection between a CU of a base station and an NGC may be maintained.

In operation S801, when the UE in the RRC_INACTIVE state needs to transitions to the RRC_CONNECTED state, the UE may first transmit a random access preamble message or a new message to a DU of the base station.

In operation S802, upon receiving the message from the UE, the DU may respond with a random access response message.

In operation S803, to resume an RRC connection, the UE may transmit an RRC connection resume request message or a new message to the DU. The RRC connection resume request message or the new message may include a resume ID for the CU of the base station to identify UE context.

In operation S804, upon receiving the RRC connection resume request message or the new message, the DU may transmit to the gNB-CU an initial uplink RRC message transfer message or a new message to the CU. The initial uplink RRC message transfer message or the new message may include a container which piggybacks the RRC connection resume request message.

In operation S805, upon receiving the message including the resume ID from the UE, the CU may check whether the CU is able to find UE context related to the resume ID.

When the UE context is exactly found on the basis of the resume ID, the CU may transmit a bearer setup request message, a UE context setup request message, or a new message to the DU in operation S806. This message may be transmitted to establish a new bearer and/or the UE context for the UE. This message may be transmitted to allocate a radio resource on the basis of the stored UE context. The CU may include the following information in the bearer setup request message or the UE context setup request message. The following information may be included per bearer.

RB ID (e.g. SRB ID or DRB ID)
Transport network layer (TNL) address for CU of base station
Uplink tunnel endpoint identifier (TEID) for CU of base station
RLC configuration
Logical channel configuration.

For example, the UE context setup request message may be defined as in Table 1.

TABLE 1

| IE/Group Name | Presence | Criticality | Assigned Criticality |
|---|---|---|---|
| Message Type | M | YES | reject |
| gNB-CU UE F1AP ID | M | YES | reject |
| gNB-DU UE F1AP ID | O | YES | ignore |
| SpCell ID | M | YES | reject |
| Candidate SpCell List | | YES | ignore |
| >Candidate SpCell Item IEs | | | |
| >>Candidate SpCell ID | M | | |
| CU to DU RRC Information | M | YES | reject |
| DRX Cycle | O | YES | ignore |
| Resource Coordination Transfer Container | O | YES | ignore |
| SCell To Be Setup List | | YES | ignore |
| >SCell to Be Setup Item IEs | | EACH | ignore |
| >>SCell ID | M | — | — |
| >>SCellIndex | M | | |
| SRB to Be Setup List | | | |
| >SRB to Be Setup Item IEs | | | |

TABLE 1-continued

| IE/Group Name | Presence | Criticality | Assigned Criticality |
|---|---|---|---|
| >SRB ID | M | | |
| DRB to Be Setup List | | YES | reject |
| >DRB to Be Setup Item IEs | | EACH | reject |
| >>DRB ID | M | — | |
| >>E-UTRAN QoS | O | | |
| >>UL Tunnels to be setup List | | | |
| >>>UL Tunnels to Be Setup Item IEs | | | |
| >>>>UL GTP Tunnel Endpoint | M | — | — |
| >>RLC Mode | M | — | |
| >>UL Configuration | O | | |

Referring to Table 1, the UE context setup request message may include an SRB to Be Setup List and a DRB to Be Setup List. The SRB to Be Setup List may include the ID of an SRB to be set up (i.e., SRB ID), and the DRB to Be Setup List may include the ID of a DRB to be set up (i.e., DRB ID). For example, the gNB-CU may allocate a gNB-CU UE F1AP ID for a UE inactive-to-UE active transition, excluding a transition only by signaling exchange, and may transmit an F1AP UE context setup request message, which may include the ID of an SRB to be set up and the ID of a DRB to be set up, to the gNB-DU.

In operation S807, upon receiving the request message from the CU, the DU may attempt to establish the UE context and/or requested bearer for the UE. Further, the DI may attempt to allocate a required resource on an F1 interface for the bearer requested to be established.

In operation S808, the DU may respond to the CU with a bearer setup response message, a UE context setup response message, or a new message in order to indicate whether the requested bearer and/or UE context is established or rejected. The DU may include the followings information in the bearer setup response message or the UE context setup response message. The following information may be included per bearer.
  RB ID (e.g. SRB ID or DRB ID) accepted by DU
  RB ID (e.g. SRB ID or DRB ID) rejected by DU
  TNL address for DU of base station
  Downlink TEID for DU of base station For example, the UE context setup response message may be defined as in Table 2.

TABLE 2

| IE/Group Name | Presence | Criticality | Assigned Criticality |
|---|---|---|---|
| Message Type | M | YES | reject |
| gNB-CU UE F1AP ID | M | YES | reject |
| gNB-DU UE F1AP ID | M | YES | reject |
| DU To CU RRC Information | M | YES | reject |
| Resource Coordination Transfer Container | O | YES | ignore |
| DRB Setup List | | YES | ignore |
| >DRB Setup Item list | | EACH | ignore |
| >>DRB ID | M | — | |
| >>DL Tunnels to be setup List | | | |
| >>>DL Tunnels to Be Setup Item IEs | | | |
| >>>>DL GTP Tunnel Endpoint | M | | |
| SRB Failed to Setup List | | YES | ignore |
| >SRB Failed to Setup Item | | EACH | ignore |
| >>SRB ID | M | — | — |
| >>Cause | O | YES | ignore |
| DRB Failed to Setup List | | YES | ignore |
| >DRB Failed to Setup Item | | EACH | ignore |
| >>DRB ID | M | — | — |
| >>Cause | O | YES | ignore |
| SCell Failed To Setup List | | YES | ignore |
| >SCell Failed to Setup Item | | EACH | ignore |
| >>SCell ID | M | | |
| >>Cause | O | | |
| Criticality Diagnostics | O | YES | ignore |

Referring to Table 2, the the UE context setup response message may include a DRB Setup List, an SRB Failed to Setup List, and a DRB Failed to Setup List. The DRB Setup List may be a list of a successfully established DRB. The DRB Setup List may include the ID of the successfully established DRB. The SRB Failed to Setup List may be a list of an SRB failing to be established. The SRB Failed to Setup List may include the ID of the SRB failing to be established. In addition, the SRB Failed to Setup List may include a cause of the failure. The DRB Failed to Setup List may be a list of a DRB failing to be established. The DRB Failed to Setup List may include the ID of the DRB failing to be established. In addition, the DRB Failed to Setup List may include a cause of the failure.

When some bearers requested in operation S806 are rejected by the DU, the CU may trigger a PDU session resource modify indication procedure to the NGC in order to request modification of an established PDU session in operation S809.

When some or all bearers requested in operation S806 are accepted by the DU, the CU may transmit, to the DU, a downlink RRC message transfer message or a new message including a container which piggybacks an RRC connection resume message. Specifically, when some bearers requested in operation S806 are rejected by the DU, since the CU fails to resume some bearers in the stored UE context, the RRC connection resume message may include a reconfiguration indication to indicate the failure of the resumption to the UE. The RRC connection resume message may be followed by an RRC connection reconfiguration message to establish/modify/release an RB.

Referring to FIG. 8B, upon receiving the message from the CU, the DI may transmit the RRC connection resume message or new message to the UE in operation S811.

In operation S812, the UE may resume all SRBs and DRBs and may reestablish AS security. Then, the UE may enter the RRC_CONNECTED state. When the reconfiguration indication is included into the RRC connection resume message, the UE waits to transmit an RRC connection reconfiguration message to establish/modify/release an RB to the CU.

In operation S813, upon receiving the RRC connection resume message from the DU, the UE may transmit an RRC connection resume complete message or a new message to the DU.

In operation S814, upon receiving the RRC connection resume complete message or the new message, the DU may transmit an uplink RRC message transfer message or a new message including a container which piggybacks the RRC connection resume complete message to the CU.

In operation S815, the CU may transmit the downlink RRC message transfer message or a new message including a container which piggybacks the RRC connection reconfiguration message to the DU. The CU may include the following information in the RRC connection reconfiguration message. The following information may be included per bearer.
 RB ID (e.g. SRB ID or DRB ID) accepted by DU
 RB ID (e.g. SRB ID or DRB ID) rejected by DU
 Updated RLC configuration
 Updated logical channel configuration Upon receiving the message from the CU, the DU may transmit the RRC connection reconfiguration message or new message to the UE in operation S816.

In operation S817, the UE may reconfigure a radio resource and a bearer on the basis of the RRC connection reconfiguration message. Then, the UE may respond to the DU with an RRC connection reconfiguration complete message or new message.

In operation S818, upon receiving the RRC connection reconfiguration complete message or the new message, the DU may transmit an uplink RRC message transfer message or new message including a container which piggybacks the RRC connection reconfiguration complete message to the CU.

According to the embodiment of the present disclosure, the CU may negotiate with the DU about UE context in the DU and/or setup of a suspended RB the on the basis of the UE context stored in the RRC-INACTIVE state. When only some RBs are established in the DU, the CU may transmit an RRC connection resume message including a reconfiguration indication to the UE. By transmitting the RRC connection resume message including the reconfiguration indication to the UE, the CU may report that an RRC connection reconfiguration procedure is to be subsequently performed to modify and release some RBs rejected by the DU. Therefore, according to the embodiment of the present disclosure, the CU may efficiently set up the RB suspended for the DU and/or the UE context on the basis of the UE context stored in the RRC-INACTIVE state. The UE may avoid a mismatch in RBs resumed in the DU of the base station, thus improving a user experience (e.g., a transition from the RRC_INACTIVE state to the RRC_CONNECTED state).

Figure 9B:
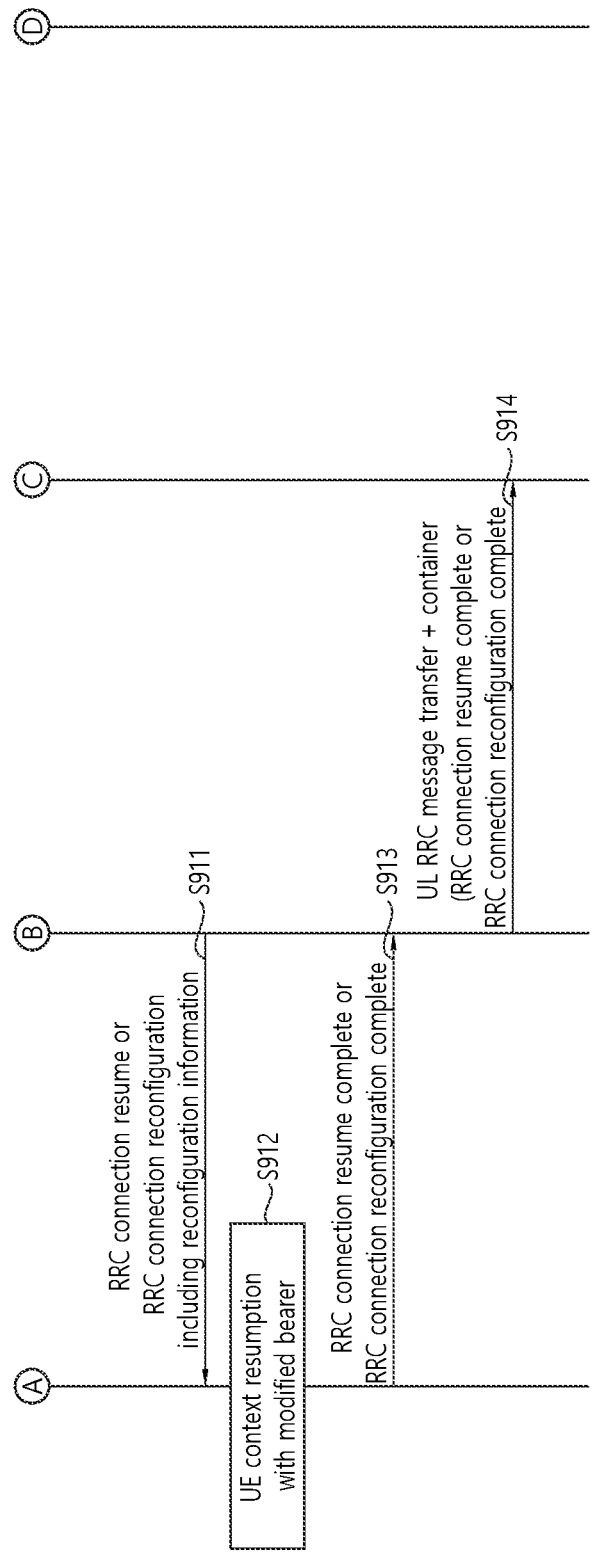

FIG. 9A and FIG. 9B illustrate a procedure for resuming an RRC connection according to one embodiment of the present disclosure.

Referring to FIG. 9A, a UE may be in the RRC_INACTIVE state. Therefore, an NG connection between a CU of a base station and an NGC may be maintained.

In operation S901, when the UE in the RRC_INACTIVE state needs to transitions to the RRC_CONNECTED state, the UE may first transmit a random access preamble message or a new message to a DU of the base station.

In operation S902, upon receiving the message from the UE, the DU may respond with a random access response message.

In operation S903, to resume an RRC connection, the UE may transmit an RRC connection resume request message or a new message to the DU. The RRC connection resume request message or the new message may include a resume ID for the CU of the base station to identify UE context.

In operation S904, upon receiving the RRC connection resume request message or the new message, the DU may transmit to the gNB-CU an initial uplink RRC message transfer message or a new message to the CU. The initial uplink RRC message transfer message or the new message may include a container which piggybacks the RRC connection resume request message.

In operation S905, upon receiving the message including the resume ID from the UE, the CU may check whether the CU is able to find UE context related to the resume ID.

When the UE context is exactly found on the basis of the resume ID, the CU may transmit a bearer setup request message, a UE context setup request message, or a new message to the DU in operation S906. This message may be transmitted to establish a new bearer and/or the UE context for the UE. This message may be transmitted to allocate a radio resource on the basis of the stored UE context. The CU may include the following information in the bearer setup request message or the UE context setup request message. The following information may be included per bearer.
 RB ID (e.g. SRB ID or DRB ID)
 Transport network layer (TNL) address for CU of base station
 Uplink tunnel endpoint identifier (TED) for CU of base station
 RLC configuration
 Logical channel configuration.

For example, the UE context setup request message may be defined as in Table 1.

Upon receiving the request message from the CU, the DU may attempt to establish the UE context and/or requested bearer for the UE in operation S907. Further, the DI may attempt to allocate a required resource on an F1 interface for the bearer requested to be established.

In operation S908, the DU may respond to the CU with a bearer setup response message, a UE context setup response message, or a new message in order to indicate whether the requested bearer and/or UE context is established or rejected. The DU may include the followings information in the bearer setup response message or the UE context setup response message. The following information may be included per bearer.
 RB ID (e.g. SRB ID or DRB ID) accepted by DU
 RB ID (e.g. SRB ID or DRB ID) rejected by DU
 TNL address for DU of base station
 Downlink TEID for DU of base station For example, the UE context setup response message may be defined as in Table 2.

When some bearers requested in operation S906 are rejected by the DU, the CU may trigger a PDU session resource modify indication procedure to the NGC in order to request modification of an established PDU session in operation S909.

When some or all bearers requested in operation S906 are accepted by the DU, the CU may transmit, to the DU, a downlink RRC message transfer message or a new message including a container which piggybacks an RRC connection resume message or an RRC connection reconfiguration message. The RRC connection resume message or the RRC connection reconfiguration message may include the following updated radio resource configuration.

RB ID (e.g. SRB ID or DRB ID) accepted by CU
RB ID (e.g. SRB ID or DRB ID) rejected by CU
Updated RLC configuration
Updated logical channel configuration Referring to FIG. 9B, upon receiving the message from the CU, the DU may transmit the RRC connection resume message or the RRC connection reconfiguration message to the UE.

In operation S912, the UE may resume some SRBs and DRBs on the basis of reconfiguration information in the RRC connection resume message or the RRC connection reconfiguration message. The UE may reestablish AS security. Then, the UE may enter the RRC_CONNECTED state.

In operation S913, upon receiving the RRC connection resume message or the RRC connection reconfiguration message from the DU, the UE may transmit an RRC connection resume complete message, an RRC connection reconfiguration complete message, or a new message to the DU.

In operation S914, the DU may transmit an uplink RRC message transfer message or a new message including a container which piggybacks the RRC connection resume complete message or the RRC connection reconfiguration complete message to the CU.

According to the embodiment of the present disclosure, the CU may negotiate with the DU about UE context in the DU and/or setup of a suspended RB the on the basis of the UE context stored in the RRC-INACTIVE state. When only some RBs are established in the DU, the CU may transmit an RRC connection resume message or an RRC connection reconfiguration message including reconfiguration information to the UE in order to release or modify some RBs rejected by the DU. The UE may resume only RBs accepted by the DU without any additional RRC connection reconfiguration procedure on the basis of the reconfiguration information. Therefore, according to the embodiment of the present disclosure, the CU may efficiently set up the RB suspended for the DU and/or the UE context on the basis of the UE context stored in the RRC-INACTIVE state. The UE may avoid a mismatch in RBs resumed in the DU of the base station, thus improving a user experience (e.g., a transition from the RRC_INACTIVE state to the RRC_CONNECTED state). Further, the UE may resume only RBs accepted by the DU without any additional RRC connection reconfiguration procedure. Therefore, the UE may quickly transmit data or a signal to the base station.

Figure 10A:
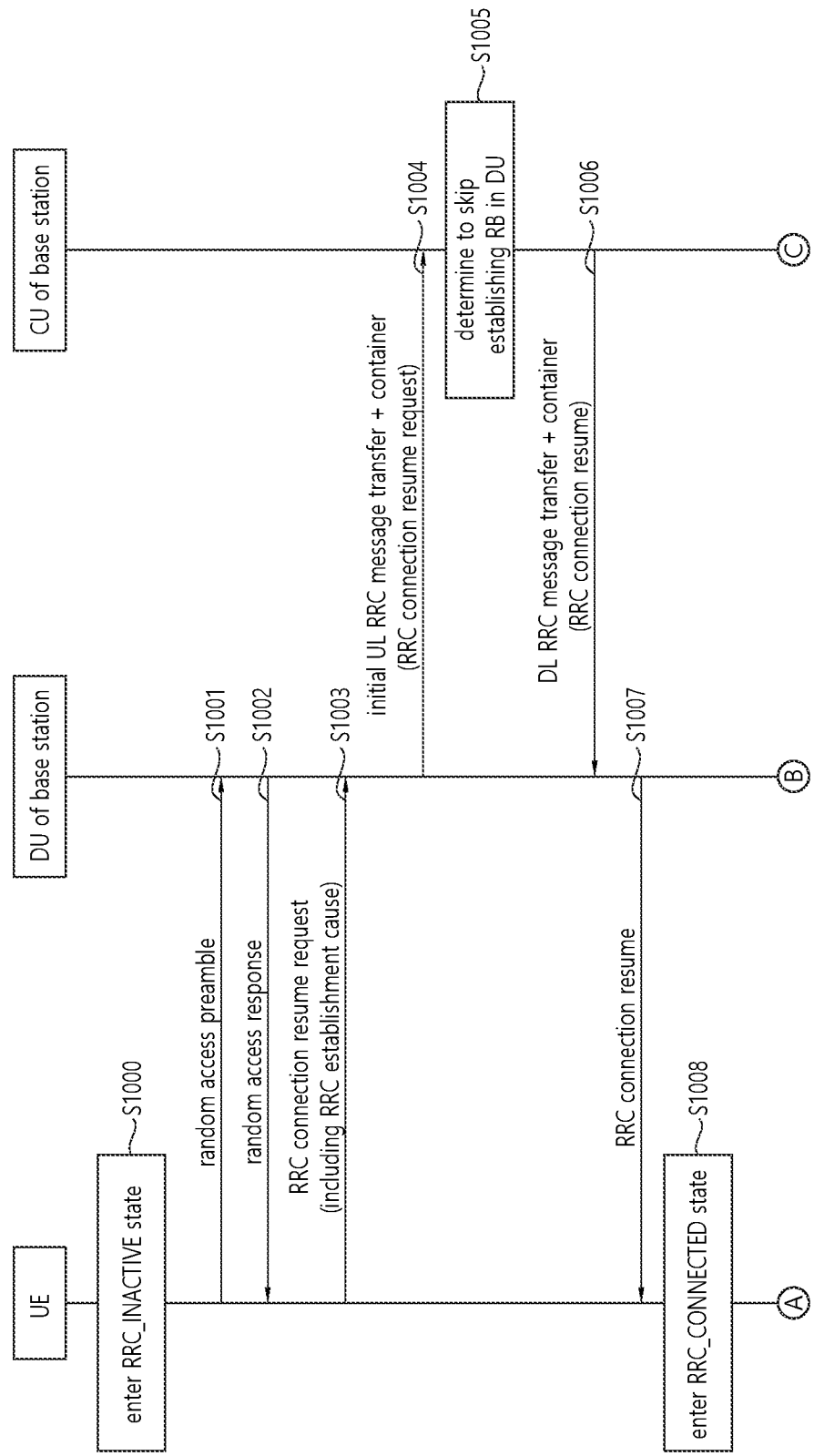
FIG. 10A and FIG. 10B illustrate a procedure of omitting UE context setup in a procedure for resuming an RRC connection according to one embodiment of the present disclosure.
Figure 10B:
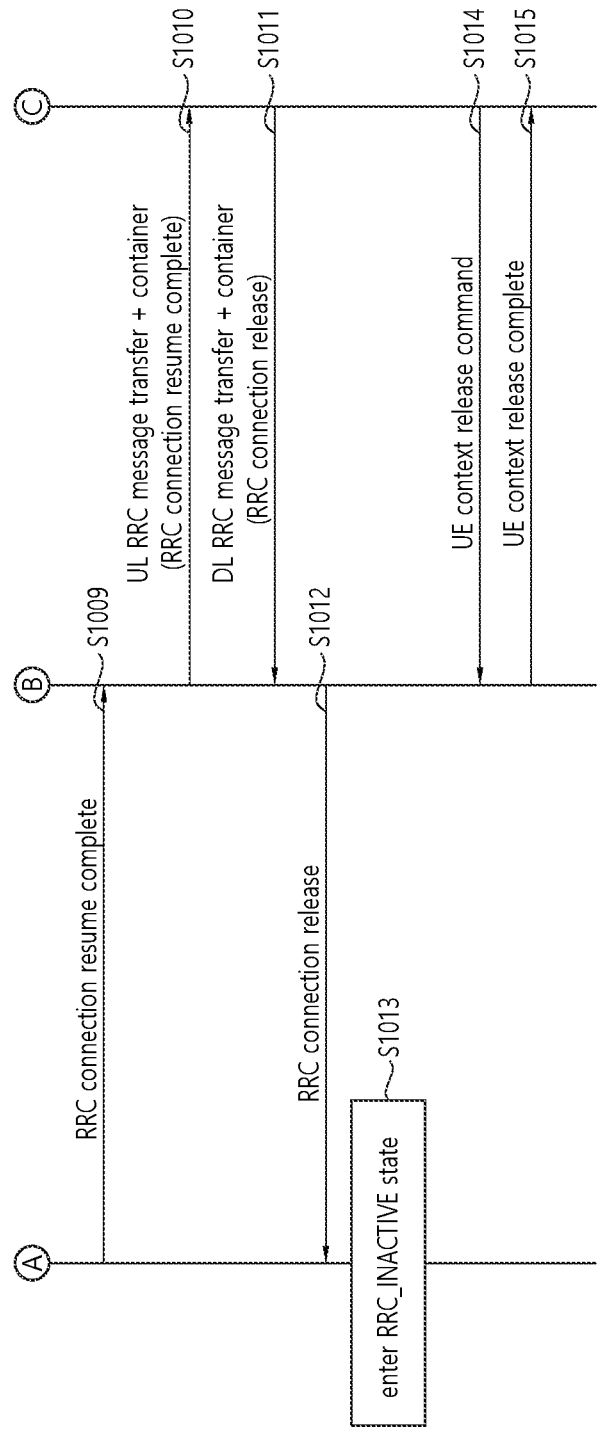

FIG. 10A and FIG. 10B illustrate a procedure of omitting UE context setup in a procedure for resuming an RRC connection according to one embodiment of the present disclosure.

Referring to FIG. 10A, in operation S1000, a UE may be in the RRC_INACTIVE state. Therefore, an NG connection between a CU of a base station and an NGC may be maintained.

In operation S1001, the UE may trigger a periodic RNAU in order to notify a network of being still reachable in a RNA. To this end, the UE in the RRC_INACTIVE state needs to transition to the RRC_CONNECTED state and may thus first transmit a random access preamble message or a new message to a DU.

In operation S1002, upon receiving the message from the UE, the DU may respond with a random access response message.

In operation S1003, to resume an RRC connection, the UE may transmit an RRC connection resume request message or a new message to the DU. The RRC connection resume request message or the new message may include a resume ID for the CU of the base station to identify UE context. An RRC establishment cause of the RNAU may be included in the RRC connection resume request message in order to notify the network of RNAU triggering. For example, the RRC establishment cause may be a location update.

In operation S1004, upon receiving the RRC connection resume request message or the new message, the DU may transmit to the gNB-CU an initial uplink RRC message transfer message or a new message to the CU. The initial uplink RRC message transfer message may include a container which piggybacks the RRC connection resume request message.

In operation S1005, upon receiving the message including the resume ID from the UE, the CU may check whether the CU is able to find UE context related to the resume ID. On the basis of the RRC establishment cause in the RRC connection resume request message, the CU may recognize this procedure as a RNAU procedure for the UE to notify the network that the UE is still reachable within the RNA.

The CU may determine to skip a procedure for establishing UE context in the DU. For example, when the CU exactly find UE context on the basis of the resume ID and recognizes the current procedure as a periodic RNAU procedure, the CU may determine to skip a procedure for establishing the UE context in the DU for the RNAU.

However, the CU may determine not to skip a procedure for establishing UE context in the DU. For example, the case of a periodic RNAU, the CU may also attempt to set up a radio bearer in. In this case, the CU may initiate a UE context setup procedure to the DU between operation S1005 and the operation S1006. For example, when the DU can successfully establish UE context and can fully set up a radio bearer suspended when the UE enters the RRC-INACTIVE state, the CU may generate an RRC connection resume message to indicate to the UE that an RRC connection is successfully resumed. When setup of the radio bearer fails in the DU, an RRC connection reject message may be generated.

In another example, when there is buffered downlink data to be transmitted to the UE, the CU may initiate a UE context setup procedure to the DU between operation S1005 and the operation S1006. That is, in the case of a transition only by signaling exchange, the CU may skip a UE context setup procedure to the DU between operation S1005 and the operation S1006. Alternatively, a UE context setup procedure may be triggered between operation S1010 and operation S1011 in order to set up a radio bearer for the UE.

In operation S1006, the CU may transmit a downlink RRC message transfer message or a new message including a container which piggybacks the RRC connection resume message to the DU.

In operation S1007, upon receiving the message from the CU, the DU may transmit the RRC connection resume message or a new message to the UE.

In operation S1008, the UE may resume all SRBs and DRBs. Further, the UE may reestablish AS security. The UE may now be in the RRC_CONNECTED state.

Referring to FIG. 10B, in operation S1009, upon receiving the RRC connection resume message from the gNB-DU, the UE may transmit an RRC connection resume complete message or a new message to the DU.

In operation S1010, upon receiving the RRC connection resume complete message or the new message, the DU may transmit an uplink RRC message transfer message or a new message including a container which piggybacks the RRC connection resume complete message to the CU.

In operation S1011, since the reachability of the UE (i.e., the reachability in the RNA) is confirmed, the CU may determine to move the UE to the RRC_INACTIVE state again. Therefore, the CU may generate an RRC connection release message including an indication to enter the RRC_INACTIVE state for the UE. The RRC message may be encapsulated in an F1-AP downlink RRC message transfer message. In addition, an F1 release indication may be included in the downlink RRC message transfer message. The F1 release indication may instruct the DU to release an F1 connection to the UE and delete the UE context. In this case, operation S1014 and operation S1015 may be skipped.

Alternative, the CU may encapsulate the RRC connection resume message in an F1-AP UE context release command message instead of the downlink RRC message transfer message. Upon receiving the UE context release command message, the DU needs to respond to the CU with a UE context release complete message after operation S1012.

In operation S1012, upon receiving the message from the CU, the DU may transmit an RRC connection release message or a new message to the UE.

In operation S1013, the UE may enter the RRC_INACTIVE state.

In operation S1014 and operation S1015, the DU may initiate a UE context release procedure with respect to the DU in order to delete the UE context in the DU and to release the F1 connection to the UE.

According to the embodiment of the present disclosure, when the UE transitions from the RRC_INACTIVE state to the RRC_CONNECTED state, a three-step RRC connection resume procedure (i.e., an RRC connection resume request message, an RRC connection resume message, and an RRC connection resume complete message) may be used. Upon receiving an RRC connection resume request message, the CU may check a reason why the UE requests resumption of an RRC connection. When data transmission is not needed and/or the reachability of the UE is identified via a RNAU, the CU may determine to skip establishing UE context in the DU. Only an F1 connection to the UE may be established between the DU and the CU in order to transmit an RRC message. According to the embodiment of the present disclosure, when a RNAU is triggered, the CU may skip a UE context setup procedure, thus eliminating unnecessary signaling. Therefore, resumption of an RRC connection may be efficiently handled during a periodic RNAU.

Figure 11:
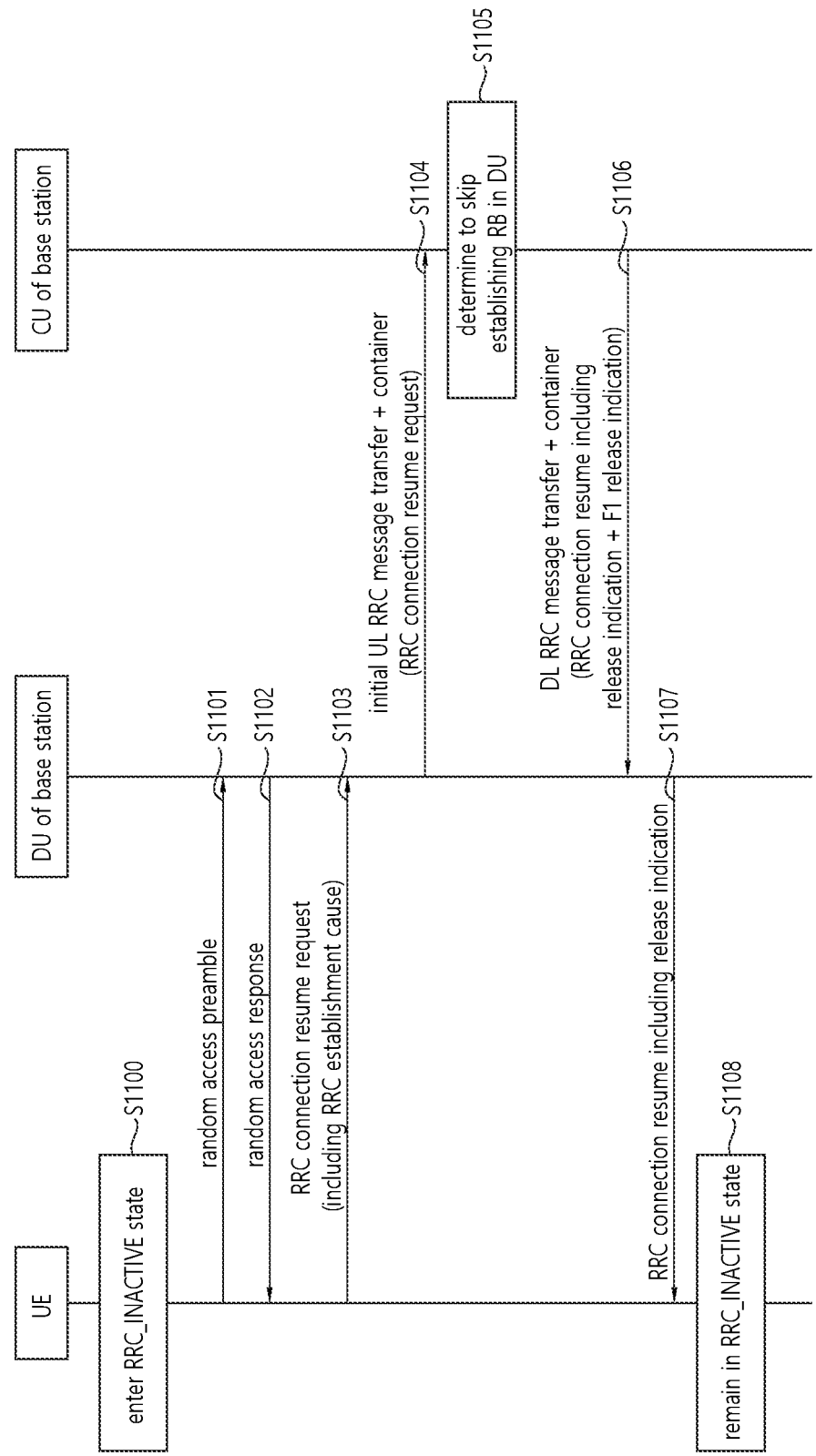
FIG. 11 illustrates a procedure of omitting UE context setup in a procedure for resuming an RRC connection according to one embodiment of the present disclosure.

FIG. 11 illustrates a procedure of omitting UE context setup in a procedure for resuming an RRC connection according to one embodiment of the present disclosure.

Referring to FIG. 11, in operation S1100, a UE may be in the RRC_INACTIVE state. Therefore, an NG connection between a CU of a base station and an NGC may be maintained.

In operation S1101, the UE may trigger a periodic RNAU in order to notify a network of being still reachable in a RNA. To this end, the UE in the RRC_INACTIVE state needs to transition to the RRC_CONNECTED state and may thus first transmit a random access preamble message or a new message to a DU.

In operation S1102, upon receiving the message from the UE, the DU may respond with a random access response message.

In operation S1103, to resume an RRC connection, the UE may transmit an RRC connection resume request message or a new message to the DU. The RRC connection resume request message or the new message may include a resume ID for the CU of the base station to identify UE context. An RRC establishment cause of the RNAU may be included in the RRC connection resume request message in order to notify the network of RNAU triggering. For example, the RRC establishment cause may be a location update.

In operation S1104, upon receiving the RRC connection resume request message or the new message, the DU may transmit to the gNB-CU an initial uplink RRC message transfer message or a new message to the CU. The initial uplink RRC message transfer message may include a container which piggybacks the RRC connection resume request message.

In operation S1105, upon receiving the message including the resume ID from the UE, the CU may check whether the CU is able to find UE context related to the resume ID. On the basis of the RRC establishment cause in the RRC connection resume request message, the CU may recognize this procedure as a RNAU procedure for the UE to notify the network that the UE is still reachable within the RNA.

The CU may determine to skip a procedure for establishing UE context in the DU. For example, when the CU exactly find UE context on the basis of the resume ID and recognizes the current procedure as a periodic RNAU procedure, the CU may determine to skip a procedure for establishing the UE context in the DU for the RNAU.

However, the CU may determine not to skip a procedure for establishing UE context in the DU. For example, the case of a periodic RNAU, the CU may also attempt to set up a radio bearer in. In this case, the CU may initiate a UE context setup procedure to the DU between operation S1105 and the operation S1106. For example, when the DU can successfully establish UE context and can fully set up a radio bearer suspended when the UE enters the RRC-INACTIVE state, the CU may generate an RRC connection resume message to indicate to the UE that an RRC connection is successfully resumed. When setup of the radio bearer fails in the DU, an RRC connection reject message may be generated. A release indication may be included in the RRC connection resume message in order to instruct the UE to move to the RRC_INACTIVE state. When the release indication is used, the CU does not need to transmit an RRC connection release message. Alternatively, instead of using the release indication, the CU may generate an RRC connection release message to move the UE to the RRC_INACTIVE state.

In another example, when there is buffered downlink data to be transmitted to the UE, the CU may initiate a UE context setup procedure to the DU between operation S1105 and the operation S1106. That is, in the case of a transition only by signaling exchange, the CU may skip a UE context setup procedure to the DU between operation S1105 and the operation S1106.

In operation S1106, the CU may transmit a downlink RRC message transfer message or a new message including a container which piggybacks the RRC connection resume message to the DU. Further, an F1 release indication may be included in the downlink RRC message transfer message. The F1 release indication may instruct the DU to release an F1 connection to the UE and delete the UE context.

Alternative, the CU may encapsulate the RRC connection resume message in an F1-AP UE context release command message instead of the downlink RRC message transfer message. In this case, the F1 release indication may not be included. Upon receiving the UE context release command message, the DU needs to respond to the CU with a UE context release complete message after operation S1107.

In operation S1107, upon receiving the message from the CU, the DU may transmit an RRC connection resume message or a new message to the UE.

In operation S1108, when the release message may be included in the RRC connection resume message, the UE may remain in the RRC_INACTIVE state. However, when the RRC connection resume message does not include the release indication, the UE may transition to the RRC_CONNECTED state.

According to the embodiment of the present disclosure, when the UE transitions from the RRC_INACTIVE state to the RRC_CONNECTED state, a two-step RRC connection resume procedure (i.e., an RRC connection resume request message and an RRC connection resume message) may be used. Upon receiving an RRC connection resume request message, the CU may check a reason why the UE requests resumption of an RRC connection. When data transmission is not needed and/or the reachability of the UE is identified via a RNAU, the CU may determine to skip establishing UE context in the DU. An F1 connection to the UE may not be established between the DU and the CU using an F1 release indication. Therefore, the UE may remain in the RRC_INACTIVE state without an unnecessary state transition to the RRC_CONNECTED state.

According to the embodiment of the present disclosure, when a RNAU is triggered, the CU may skip a UE context setup procedure, thus eliminating unnecessary signaling. Further, using a release indication of an RRC connection resume message and an F1 release indication of a downlink RRC message transfer message makes it possible to eliminate an additional RRC state transition to the RRC_CONNECTED state and unnecessary management for UE context in the DU.

According to the embodiment of the present disclosure, the base station may selectively trigger a UE context setup procedure in order to resume an RRC connection. Since release and establishment of UE context may be skipped in a RNAU, the CU can efficiently manage UE context in the DU. In addition, the base station can confirm the reachability of the UE without setting up an F1 connection in a 2-step RRC connection resume procedure. Therefore, a user experience (e.g., a transition from the RRC_INACTIVE state to the RRC_CONNECTED state) may be improved.

Figure 12:
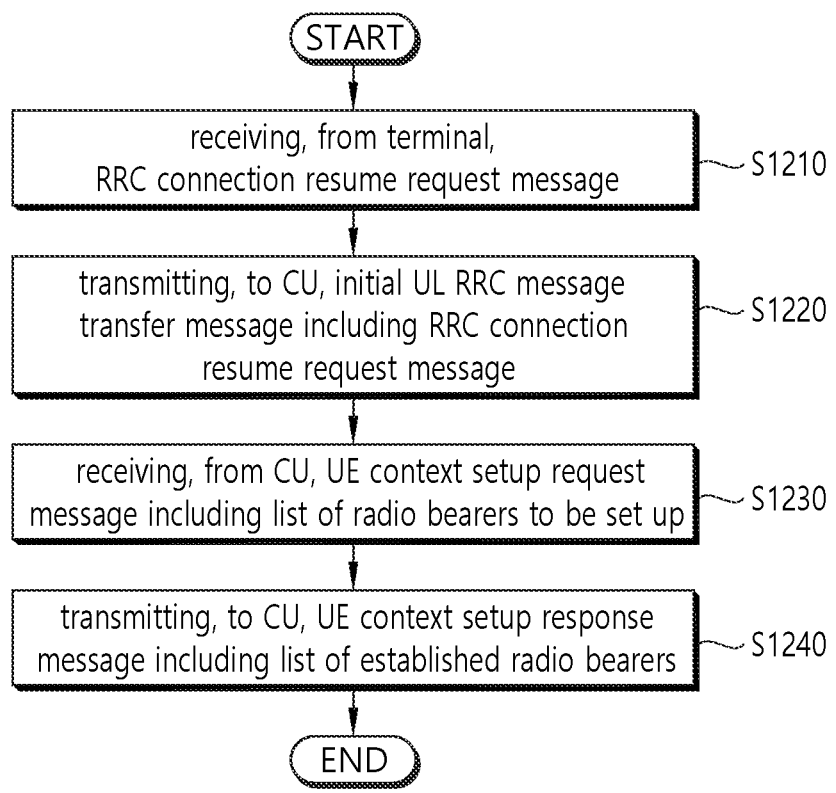
FIG. 12 is a block diagram illustrating a method for a DU of a base station to resume an RRC connection according to one embodiment of the present disclosure.

FIG. 12 is a block diagram illustrating a method for a DU of a base station to resume an RRC connection according to an embodiment of the present disclosure.

Referring to FIG. 12, in operation S1210, the DU of the base station may receive an RRC connection resume request message from a UE. The UE may be in the RRC_INACTIVE state.

In operation S1220, the DU of the base station may transmit an initial uplink RRC message transfer message including the RRC connection resume request message to a CU of the base station. The initial uplink RRC message transfer message may be transmitted to the CU in response to the RRC connection resume request message.

In operation S1230, the DU of the base station may receive a UE context setup request message including a list of a radio bearer to be set up from the CU. The UE context setup request message may be received from the CU in response to the initial uplink RRC message transfer message.

In addition, the DU of the base station may establish at least one radio bearer among radio bearers included in the list of the radio bearer to be set up.

The list of the radio bearer to be set up may include an ID of the radio bearer to be set up. The radio bearer may be a data radio bearer (DRB) or a signaling radio bearer (SRB).

In operation S1240, the DU of the base station may transmit a UE context setup response message including a list of the established radio bearer to the CU. The UE context setup response message may be transmitted to the CU in response to the RRC connection resume request message.

The established radio bearer may be a radio bearer admitted by the DU among radio bearers to be set up. The list of the established radio bearer may include an ID of the established radio bearer.

The UE context setup response message may further include a list of a failed radio bearer. The failed radio bearer may be a radio bearer rejected by the DU among the radio bearers to be set up. The list of the failed radio bearer may include an ID of the failed radio bearer.

Further, the DU of the base station may receive a downlink RRC message transfer message including an RRC connection resume message from the CU. The DU of the base station may transmit the RRC connection resume message to the UE. The DU of the base station may receive an RRC connection resume complete message from the UE.

When the UE is reachable within a RAN-based notification area, it is possible to skip receiving the UE context setup request message and transmitting the UE context setup response message. When the CU determines to skip setting up UE context, it is possible to skip receiving the UE context setup request message and transmitting the UE context setup response message.

Figure 13:
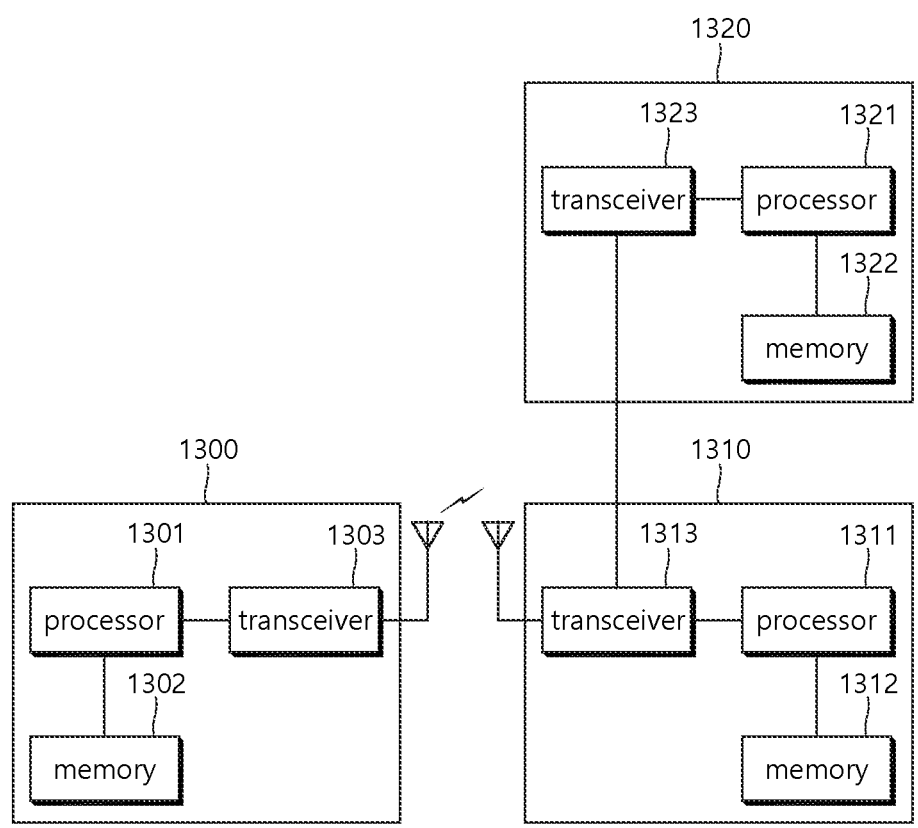
FIG. 13 is a block diagram illustrating a wireless communication system to which the present disclosure may be applied.

FIG. 13 is a block diagram illustrating a wireless communication system to which the present disclosure may be applied.

A UE 1300 includes a processor 1301, a memory 1302 and a transceiver 1303. The memory 1302 is connected to the processor 1301, and stores various pieces of information for driving the processor 1301. The transceiver 1303 is connected to the processor 1301, and transmits and/or receives radio signals. The processor 1301 implements proposed functions, processes and/or methods. In the above embodiment, an operation of the user equipment may be implemented by the processor 1301.

A DU of a base station 1310 includes a processor 1311, a memory 1312 and a transceiver 1313. The memory 1312 is connected to the processor 1311, and stores various pieces of information for driving the processor 1311. The transceiver 1313 is connected to the processor 1311, and transmits and/or receives radio signals. The processor 1311 implements proposed functions, processes and/or methods. In the above embodiment, an operation of the DU may be implemented by the processor 1311.

A CU of the base station 1320 includes a processor 1312, a memory 1322 and a transceiver 1323. The memory 1322 is connected to the processor 1321, and stores various information for driving the processor 1321. The transceiver 1323 is connected to the processor 1321, and transmits and/or receives radio signals. The processor 1321 implements proposed functions, processes and/or methods. In the above embodiment, an operation of the CU may be implemented by the processor 1321.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the disclosure disclosed in the claims is not limited to the order of the steps or blocks, and each step or block can be implemented in a different order, or can be performed simultaneously with other steps or blocks. In addition, those ordinarily skilled in the art can know that the disclosure is not limited to each of the steps or blocks, and at least one different step can be added or deleted without departing from the scope and spirit of the disclosure.

The aforementioned embodiment includes various examples. It should be noted that those ordinarily skilled in the art know that all possible combinations of examples cannot be explained, and also know that various combinations can be derived from the technique of the present specification. Therefore, the protection scope of the disclosure should be determined by combining various examples described in the detailed explanation, without departing from the scope of the following claims.

What is claimed is:

1. A method performed by a central unit (CU) of a base station in a wireless communication system, the method comprising:
   receiving, from a distributed unit (DU) of the base station, an initial uplink radio resource control (RRC) message transfer message comprising an RRC connection resume request message;
   transmitting, to the DU, a user equipment (UE) context setup request message comprising a list of one or more radio bearers to be setup and a radio link control (RLC) configuration related to the one or more radio bearers to be setup; and
   receiving, from the DU, a UE context setup response message comprising a list of one or more established radio bearers.

2. The method of claim 1, further comprising:
   establishing at least one radio bearer in the list of the one or more radio bearers to be setup.

3. The method of claim 1, wherein the list of the one or more radio bearers to be setup comprises a identifier (ID) of the one or more radio bearers to be setup.

4. The method of claim 1, wherein the one or more established radio bearers are radio bearers admitted by the DU among the one or more radio bearers to be setup.

5. The method of claim 1, wherein the list of the one or more established radio bearers comprise an identifier (ID) of the one or more established radio bearers.

6. The method of claim 1, wherein the UE context setup response message further comprises a list of one or more failed radio bearers.

7. The method of claim 6, wherein the list of the one or more failed radio bearers comprise a radio bearer rejected by the DU among the one or more radio bearers to be setup.

8. The method of claim 6, wherein the list of the one or more failed radio bearers comprise a identifier (ID) of the one or more failed radio bearers.

9. The method of claim 1, wherein the one or more radio bearers comprise at least one of a data radio bearer (DRB) or a signalling radio bearer (SRB).

10. The method of claim 1, further comprising:
    transmitting, to the DU, a downlink RRC message transfer message comprising an RRC connection resume message.

11. The method of claim 1, wherein, when the CU determines to skip setting up a UE context, the transmitting of the UE context setup request message and the receiving of the UE context setup response message are skipped.

12. A central unit (CU) of a base station in a wireless communication system, the CU comprising:
    a memory;
    a transceiver; and
    at least one processor operatively coupled to the memory and the transceiver,
    wherein the at least one processor is configured to control the transceiver to:
    receive, from a distributed unit (DU) of the base station, an initial uplink radio resource control (RRC) message transfer message comprising an RRC connection resume request message,
    transmit, to the DU, a user equipment (UE) context setup request message comprising a list of one or more radio bearers to be setup and radio link control (RLC) configuration related to the one or more radio bearers to be setup, and
    receive, from the DU, a UE context setup response message comprising a list of one or more established radio bearers.

13. A method performed by a user equipment (UE) in a wireless communication system, the method comprising:
    transmitting, to a distributed unit (DU) of a base station, a radio resource control (RRC) connection resume request message;
    receiving, from the DU, an RRC connection resume message after a UE context setup procedure; and
    transmitting, to the DU, an RRC connection resume complete message,
    wherein the UE context setup procedure is performed after an initial uplink RRC message transfer message comprising the RRC connection resume request message is transmitted from the DU to a central unit (CU) of the base station,
    wherein, in the UE context setup procedure, a UE context setup request message is transmitted from the CU to the DU and a UE context setup response message is transmitted from the DU to the CU, wherein the UE context setup request message comprises a list of one or more radio bearers to be setup and a radio link control (RLC) configuration related to the one or more radio bearers to be setup, and wherein the UE context setup response message comprises a list of one or more established radio bearers.

14. The method of claim 13, further comprising:

receiving, from the DU, an RRC connection resume message; and transmitting, to the DU, an RRC connection resume complete message.

15. The method of claim 13, wherein the UE is in an RRC inactive state.

* * * * *

UNITED STATES PATENT AND TRADEMARK OFFICE
CERTIFICATE OF CORRECTION

PATENT NO. : 11,638,320 B2
APPLICATION NO. : 17/156303
DATED : April 25, 2023
INVENTOR(S) : Seokjung Kim, Daewook Byun and Jian Xu Page 1 of 1

It is certified that error appears in the above-identified patent and that said Letters Patent is hereby corrected as shown below:

On the Title Page

In Item (63), Column 1, Line 1, after "filed" insert -- on Jan. 30, 2020, now Pat. No. 10,904,941, which is a National stage application of International --, therefor.

In Item (63), Column 1, Line 1, after "filed" delete "as".

In Item (63), Column 1, Line 2, after "PCT/KR2018/008620" insert -- , filed --.

In Item (63), Column 1, Line 3, after "2018," delete "now Pat. No. 10,904,941".

Signed and Sealed this
Twenty-second Day of October, 2024

Katherine Kelly Vidal
*Director of the United States Patent and Trademark Office*